United States Patent [19]

Peppiatt

[11] Patent Number: 4,573,203
[45] Date of Patent: Feb. 25, 1986

[54] REUSABLE PLASTIC BAG WITH LOOP HANDLE

[75] Inventor: Harry R. Peppiatt, Doylestown, Pa.

[73] Assignee: Paramount Packaging Corp., Chalfont, Pa.

[21] Appl. No.: 388,381

[22] Filed: Jun. 14, 1982

[51] Int. Cl.⁴ .............................................. B65D 33/10
[52] U.S. Cl. ....................................... 383/8; 206/676; 229/57 AL; 229/DIG. 6; 383/29; 383/100
[58] Field of Search ................ 229/54 R, 62, 52 AL, 229/52 B, DIG. 6, 3.5 R; 150/12; 206/620, 626, 621; 383/29, 67, 76, 8, 18, 108, 75, 100, 103

[56] References Cited

U.S. PATENT DOCUMENTS

| | | | |
|---|---|---|---|
| Re. 25,966 | 2/1966 | Wilcox | 229/52 AL |
| 1,701,097 | 2/1929 | Broderick | 383/18 |
| 1,733,219 | 10/1929 | Duvall | 229/54 R |
| 1,808,375 | 6/1931 | Plooster | 383/6 |
| 1,971,064 | 8/1934 | Corlette et al. | 383/103 |
| 2,679,969 | 6/1954 | Richter | 229/3.5 R |
| 2,722,367 | 11/1955 | Verlin | 229/54 R |
| 2,745,593 | 5/1956 | Brady | 229/54 R |
| 3,006,532 | 10/1961 | Fine | 383/6 |
| 3,093,295 | 6/1963 | Kugler | 383/75 |
| 3,140,038 | 7/1964 | LaGuerre | 383/15 |
| 3,206,104 | 9/1965 | Cohen | 229/52 AL |
| 3,282,493 | 11/1966 | Karrons et al. | 206/626 |
| 3,309,008 | 3/1967 | Hucle | 383/29 |
| 3,339,606 | 9/1967 | Kugler | 229/62 |
| 3,370,630 | 2/1968 | Haugh et al. | 150/12 |
| 3,378,189 | 4/1968 | Dickson | 383/103 X |
| 3,502,258 | 3/1970 | Kugler et al. | 206/620 X |
| 3,507,943 | 4/1970 | Gerard | 383/103 |
| 3,568,918 | 3/1971 | Blomqvist | 383/17 X |
| 3,580,486 | 5/1971 | Kugler | 383/18 |
| 3,738,567 | 6/1973 | Ruda | 383/75 |
| 3,738,568 | 6/1973 | Ruda | 383/75 |
| 3,807,679 | 4/1974 | Burke et al. | 215/100 A |
| 3,998,380 | 12/1976 | Kanelous | 206/626 |
| 4,252,269 | 2/1981 | Peppiatt | 229/54 R |

FOREIGN PATENT DOCUMENTS

| | | |
|---|---|---|
| 1922955 | 6/1965 | Fed. Rep. of Germany . |
| 1928438 | 12/1965 | Fed. Rep. of Germany . |
| 1967622 | 4/1967 | Fed. Rep. of Germany . |
| 7121512 | 6/1971 | Fed. Rep. of Germany . |
| 1551228 | 12/1968 | France . |
| 1162013 | 8/1969 | United Kingdom ................ 383/103 |

Primary Examiner—William Price
Assistant Examiner—Bryon Gehman
Attorney, Agent, or Firm—Seidel, Gonda, Goldhammer & Abbott

[57] ABSTRACT

A reusable plastic bag with a loop handle is disclosed for packaging goods in a sealed manner with perforations being provided to facilitate access to the goods without interfering with the reusability of the bag. The bag is made from a laminate of opaque plastic material on which printing is applied and over which is bonded a transparent layer to protect the printing and increase the strength of the bag.

13 Claims, 5 Drawing Figures

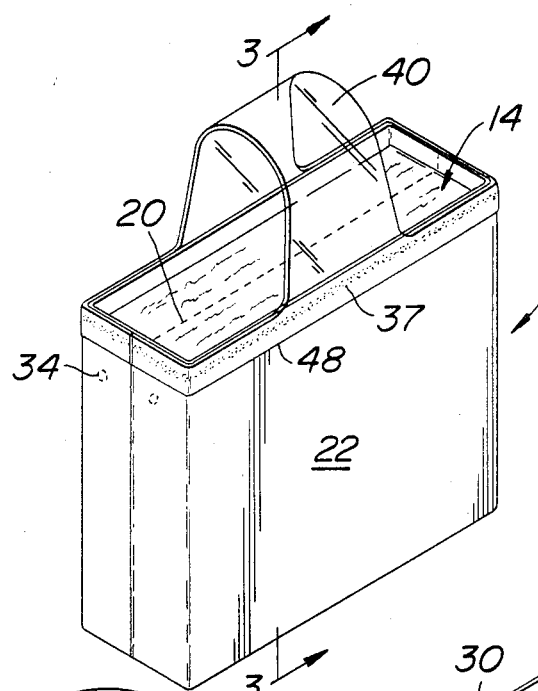
FIG. 1
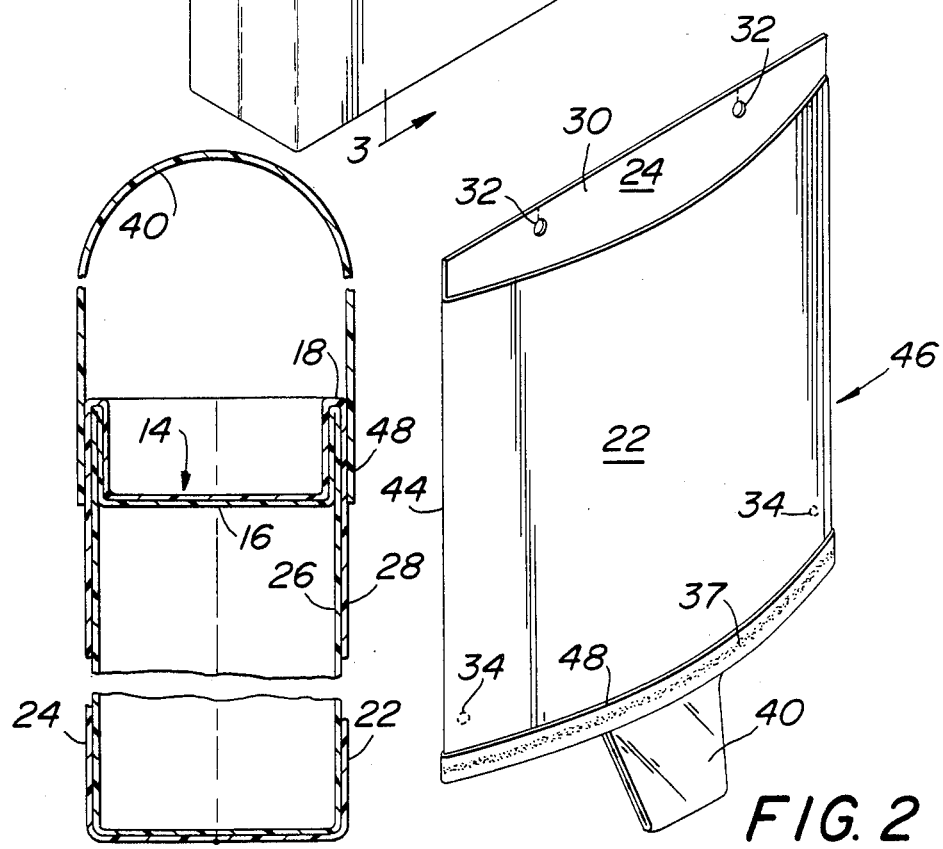
FIG. 2
FIG. 3

REUSABLE PLASTIC BAG WITH LOOP HANDLE

BACKGROUND

Plastic bags of the general type involved herein are known. For example, see U.S. Pat. No. 4,252,269. When goods are packaged and sealed in the bag as disclosed in said patent, the bag is destroyed when one gains access to the contents of the bag. Such destruction of the bag is considered to be an unnecessary waste. The present invention is directed to solution of the problem of how to design a bag which will enable goods to be sealed therein while providing for access to the goods in a non-destructive manner whereby the bag may be reused.

SUMMARY OF THE INVENTION

The present invention is directed to a bag having generally rectangular front and rear panels overlying one another. An integral gusset extends between the side edges of the panels and along one end of the panels. The gusset has a fold line located between the panels and defining the inner boundary portion of the gusset. Each panel has a fold line at said one end which defines the outer boundary of the gusset. The other end of the panels is open to facilitate introducing goods into the bag. The side edges of the panels are connected together.

A handle, defined by a loop of plastic material, has a flange at each end. A central portion of the loop is narrower than the ends of the loop. Each flange has a length substantially equal to the width of the panels. Each flange is welded to a separate one of the panels adjacent the outer boundary portion of said gusset. The gusset is provided with means to facilitate access to the goods in the bag and thereafter permit reuse of the bag. The loop is longer than the transverse width of the gusset so a person's arm may extend through the loop for the purpose of supporting the bag.

It is an object of the present invention to provide a plastic bag which can be sealed during packaging of goods in the bag, wherein access to the goods may be attained at a non-destructive manner which permits reuse of the bag.

It is another object of the present invention to provide a plastic bag made from a laminate of opaque plastic material having printing on one surface thereof and with a transparent layer overlying the printed surface and bonded to the opaque layer to thereby provide a stronger bag and wherein the printing is protected from scuffing.

Other objects and advantages will appear hereinafter.

For the purpose of illustrating the invention, there is provided in the drawing a form which is presently preferred; it being understood, however, that this invention is not limited to the precise arrangements and instrumentalities shown.

FIG. 1 is a perspective view of a package made from the bag of the present invention.

FIG. 2 is a perspective view of a bag in accordance with the present invention.

FIG. 3 is a sectional view taken along the line 3—3 in FIG. 1.

DETAILED DESCRIPTION

Figure 4:
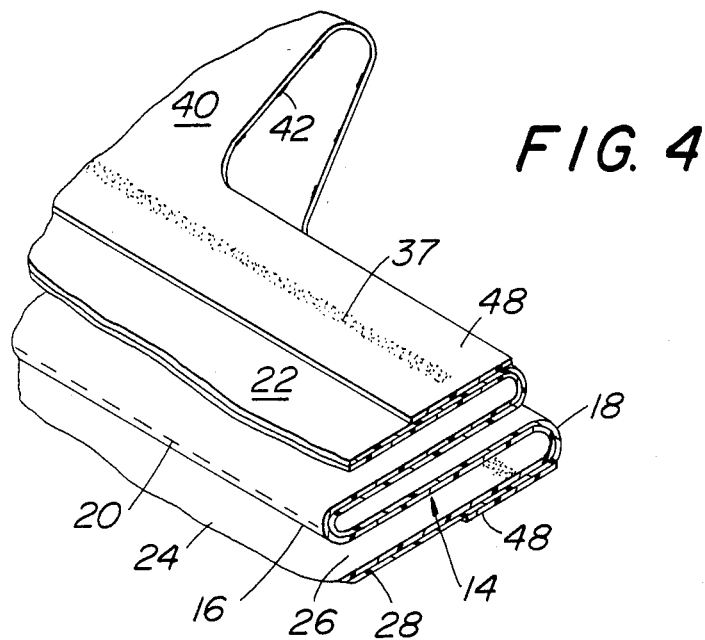
FIG. 4 is a perspective view of the gusset at the closed end of the bag.

Referring to the drawing in detail, wherein like numerals indicate like elements, there is shown in FIG. 1 a package designated generally as 10 and made from the bag of the present invention. The package is sealed so as to prevent access to the goods except in a manner which will be readily apparent and described in greater detail hereinafter.

A continuously moving web 12 of polymeric plastic material is folded along one longitudinally extending side edge so as to have an upper panel 22 and a lower panel 24. The fold line is folded inwardly in a known manner to form a gusset designated generally as 14. See FIG. 4. The gusset 14 has an inner boundary 16 and an outer boundary 18. Along the inner boundary 16, there is provided a line of perforations 20.

The web 12 and consequently the panels 22 and 24 are preferably a laminate of an inner layer 26 and an outer layer 28. Use of a laminate provides a choice of different materials having different properties. The inner layer 26 is opaque and has printing on its outer surface. The outer layer 28 is transparent and is adhesively or otherwise bonded to the inner layer and overlies the printing to protect the same. Preferred dimensions and materials are an inner layer 26 of white opaque polyethylene having a thickness of 0.00125 inches while layer 28 is clear polyethylene having a thickness of 0.00175 inches. A laminated bag made in this manner is 25% stronger than a bag made from a single material having the same total thickness. The plastic material may be polypropylene, polyester, polyethylene, etc.

Figure 5:
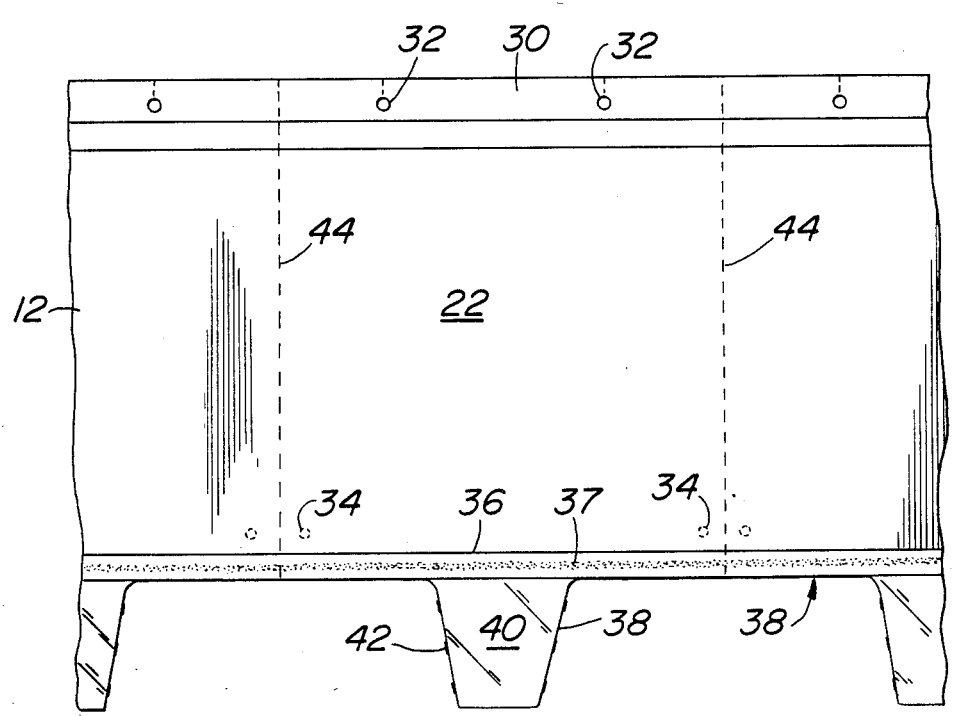
FIG. 5 is a plan view of the web from which the bag of the present invention is made and before the bag is delineated from the web.

As shown more clearly in FIGS. 2 and 5, when the front panel 22 was folded to overlie the rear panel 24, the front panel was shorter in height than the rear panel whereby the rear panel has a tab 30 projecting beyond the front panel 22. Within the tab 30, there is provided one or more holes 32 with a perforation line extending to the adjacent edge of the rear panel 24. After the gusset 14 is formed, the web 12 is perforated at spaced points so as to provide at least two holes 34 defined by arcuate perforations. Holes 34 are vent holes.

Referring to FIG. 5, a web 36 of transparent plastic material is folded so as to be generally U-shaped with the free edges overlying the outer boundary portion 18 of the gusset 14. Thus, one edge portion of the web 36 overlies the front panel 22 while the other edge portion of the web 36 overlies the rear panel 24. Thereafter, the web 36 is welded to the front and rear panels 22, 24 as defined by the weld line 37. Thereafter, the web 36 is diecut at 38 so as to delineate a handle 40 in a central portion of the front and rear panels. The handle 40 is in the form of a loop with its side edges being tack welded. Handle 40 is narrower at its bight and has a total length which is longer than the width of the gusset 14. The tack welds are designated 42 and temporarily prevent the handle 40 from flopping around as a loop. Thereafter, the web 12 is cut and welded along the lines 44 to thereby delineate discrete bags 46. Lines 44 identify the side edges of the bag 46. See FIG. 2.

The bag 46 as shown in FIG. 2 may be loaded as a stack of bags on a bagging machine with prongs extending through the aligned holes 32. When a product is machine fed into the bag 46, it is done with sufficient force so as to strip the bag 46 off the prongs and thereby tearing the tab 30 from holes 32 to the edge of the tab 30. At the same time, the air within the bag is forced out of the vent holes 34. At the same time, the handle 40 is separated from itself at tack welds 42 whereby the handle 40 is now in the form of a loop as shown more clearly in FIG. 3.

Handle 40 is preferably made from 0.005 inch thick transparent plastic material such as polyethylene so that it does not obscure the printing on the exposed surface of the gusset as shown more clearly in FIG. 1. The only remaining portion of the web 36, other than the handle 40, is the flange 48 which is welded to the front and rear panels of the bag 46 across the full width thereof. The widest portion on the handle 40 is adjacent the flanges 48 and may be 13 to 15 centimeters. At its bight, the handle 40 may be 7 to 10 centimeters wide. At the location where the handle 40 merges into the flange 48, it is defined by an arcuate surface as shown more clearly in FIGS. 1 and 4.

Thus, the bag 46 is structurally interrelated in a manner whereby it may be continuously along a production line. The bag 46 is capable of being machine loaded with bulky goods which cause the package 10 to be a six-sided figure and have a loop type carrying handle so that it may be slipped over a person's arm. At the same time, the bag is constructed in a manner whereby access may be had to the product by severing the line of perforations 20. Such access does not destroy the utility of the bag whereby it may be reused.

The present invention may be embodied in other specific forms without departing from the spirit or essential attributes thereof and, accordingly, reference should be made to the appended claims, rather than to the foregoing specification, as indicating the scope of the invention.

I claim:

1. A bag comprising a unitary piece of flexible thermoplastic material including generally rectangular front and rear panels of flexible thermoplastic material overlying one another and a gusset integral in one piece with said panels and extending between the edges of said panels along one end of said panels to form a closed end of the bag, said gusset being flexible and having a fold line located between said panels and defining the inner boundary of said gusset, each panel having a fold line at said one end defining the outer boundary portion of said gusset, the other end of said panels being open to facilitate introducing goods into the bag, the side edges of said panels and said gusset being connected together in a manner so that the bag when filled can approximate the shape of a hexahedron with said gusset being flattened to form a substantially planar closed end of the bag, a flexible handle defined by a loop of thermoplastic material collapsible on itself, each end of said loop being welded to a separate one of said panels outside and adjacent the outer boundary portion of said gusset by a weld zone at the loop end, said gusset including frangible means integral therewith to facilitate access to goods in the bag and thereafter permit reuse of the bag, said frangible means facilitating provision of an elongated opening in the gusset substantially perpendicular to the length of the handle, and said loop being longer than the transverse width of the gusset so that a person's arm may extend through the loop for the purpose of supporting the bag when said gusset is flattened.

2. A bag in accordance with claim 1 wherein a central portion of the loop is narrower than the ends of the loop.

3. A bag in accordance with claim 1 wherein said means to facilitate access is a line of perforations along the inner boundary portion of said gusset.

4. A bag in accordance with claim 1 wherein said handle is made from a transparent plastic material, and said gusset having printing thereon.

5. A bag in accordance with claim 1 wherein a central portion of the loop is narrower than the ends of the loop, with the width of the loop being between three and six inches.

6. A bag in accordance with claim 1 wherein said panels are a laminate, the inner layer of said panels being opaque with printing on its outer surface, the outer layer of the panels being transparent and bonded to the printed surface of the inner layer.

7. A bag in accordance with claim 1 wherein said means to facilitate access provides an opening in the gusset between the ends of the loop.

8. A bag in accordance with claim 1 including vent holes in said bag adjacent the closed end of the bag.

9. A bag comprising a unitary piece of flexible plastic material including generally rectangular front and rear flexible plastic panels overlying one another and a gusset integral with and extending between the edges of said panels along one end of said panels, said gusset being flexible and having a fold line located between said panels and defining the inner boundary of said gusset, each panel having a fold line at said one end defining the outer boundary portion of said gusset, the other end of said panels being open to facilitate introducing goods into the bag, the side edges of said gusset and panels being connected together in a manner so that the bag when filled can approximate the shape of a hexahedron with said gusset being flattened to form a substantially planar closed end of the bag, a handle defined by a loop of flexible plastic material collapsible on itself and having a flange at each end, each flange having a length substantially equal to the width of said panels, each flange being welded to a separate one of said panels outside and adjacent the outer boundary portion of said gusset by a weld zone extending across the handle flange in a direction substantially parallel to said gusset outer boundary, said gusset having a line of perforations substantially perpendicular to the length of the loop to facilitate access to the goods in the bag and thereafter permit reuse of the bag, said loop being longer than the transverse width of the gusset so that a person's arm may extend through the loop for the purpose of supporting the bag when said gusset is flattened.

10. A bag in accordance with claim 9 wherein said panels are a laminate, the inner layer of said panels being opaque with printing on its outer surface, the outer layer of the panels being transparent and bonded to the printed surface of the inner layer.

11. A bag in accordance with claim 9 wherein said perforations are in the gusset between the ends of the loop.

12. A bag comprising a unitary piece of flexible plastic material including generally rectangular front and rear flexible plastic panels overlying one another and a gusset integral with and extending between the edges of said panels along one end of said panels, the other end of said panels being open to facilitate introducing goods into the bag, the side edges of said gusset and panels being connected together in a manner so that the bag when filled can approximate the shape of a hexahedron with said gusset being flattened to form a substantially planar closed end of the bag, and a handle defined by a loop of flexible plastic material collapsible on itself, each loop end being welded to a separate one of said panels outside said gusset and along said one end of said panels by a weld zone at the loop end, said gusset being flexible and having perforations substantially perpendicular to the length of the loop to facilitate access to goods in the bag and thereafter permit reuse of the bag, said loop being longer than the transverse width of said gusset so that a person's arm may extend through the loop for the purpose of supporting the bag when said gusset is flattened.

13. A bag in accordance with claim 12 including air vent holes in said panels adjacent said gusset.

* * * * *

REEXAMINATION CERTIFICATE (1038th)
United States Patent [19]
Peppiatt

[11] B1 4,573,203

[45] Certificate Issued  Apr. 18, 1989

[54] REUSABLE PLASTIC BAG WITH LOOP HANDLE

[75] Inventor: Harry R. Peppiatt, Doylestown, Pa.

[73] Assignee: Paramount Packaging Corp., Chalfont, Pa.

Reexamination Request:
No. 90/001,501, Apr. 29, 1988

Reexamination Certificate for:
Patent No.: 4,573,203
Issued: Feb. 25, 1986
Appl. No.: 388,381
Filed: Jun. 14, 1982

[51] Int. Cl.⁴ .............................................. B65D 33/10
[52] U.S. Cl. ..................................... 383/29; 206/626; 279/52 AL; 279/DIG. 6; 383/100

[56] References Cited
U.S. PATENT DOCUMENTS

| Patent No. | Date | Inventor |
|---|---|---|
| Re. 25,966 | 2/1966 | Wilcox . |
| 1,808,375 | 6/1931 | Plooster . |
| 1,910,780 | 5/1933 | Brady . |
| 2,021,787 | 11/1935 | Janowitz . |
| 2,603,407 | 7/1952 | Crary . |
| 2,603,409 | 7/1952 | Crary . |
| 2,693,836 | 11/1954 | Hayes . |
| 2,722,367 | 11/1955 | Verlin . |
| 2,722,368 | 11/1955 | Gottsegen . |
| 2,978,769 | 4/1961 | Harrah . |
| 3,065,845 | 11/1962 | Nichols . |
| 3,140,038 | 7/1964 | LaGuerre . |
| 3,145,908 | 8/1964 | Smith . |
| 3,179,327 | 4/1965 | Burton . |
| 3,181,583 | 5/1965 | Lingenfelter . |
| 3,208,492 | 9/1965 | Braithewaite . |
| 3,240,420 | 3/1966 | Membrino . |
| 3,282,173 | 11/1966 | Davis et al. . |
| 3,282,493 | 11/1966 | Karrons et al. . |
| 3,283,994 | 11/1966 | Miller . |
| 3,339,606 | 9/1967 | Kugler . |
| 3,346,883 | 10/1967 | Ersek . |
| 3,358,904 | 12/1967 | Van Houtte . |
| 3,370,630 | 2/1968 | Haugh et al. . |
| 3,378,189 | 4/1968 | Dickson . |
| 3,402,749 | 9/1968 | Kinzler . |
| 3,439,866 | 4/1969 | Kuhnle . |
| 3,451,613 | 6/1969 | Vande Sande . |
| 3,462,068 | 8/1969 | Suominen . |
| 3,463,381 | 8/1969 | Wainberg . |
| 3,471,871 | 10/1969 | Nociti et al. . |
| 3,473,589 | 10/1969 | Gotz . |
| 3,477,634 | 11/1969 | Karrons et al. . |
| 3,481,051 | 12/1969 | Davis, Jr. . |
| 3,490,681 | 1/1970 | Niemeyer . |
| 3,490,682 | 1/1970 | Schwarzkopt . |
| 3,497,130 | 2/1970 | Stahl . |
| 3,506,048 | 4/1970 | Jortikka . |
| 3,509,879 | 5/1970 | Bathish . |
| 3,509,927 | 5/1970 | Hasty . |
| 3,514,033 | 5/1970 | Goodwin . |
| 3,520,470 | 7/1970 | Korn et al. . |
| 3,529,317 | 9/1970 | Schwarzkopf . |
| 3,554,435 | 1/1971 | Martinez . |
| 3,567,110 | 3/1971 | Susuki . |
| 3,640,450 | 2/1972 | Lieberman . |
| 3,693,785 | 9/1972 | Sincarage et al. . |
| 3,721,383 | 3/1973 | Dufes . |
| 3,738,567 | 6/1973 | Ruda . |
| 3,738,568 | 6/1973 | Ruda . |
| 3,746,215 | 7/1973 | Ausnit et al. . |
| 3,827,472 | 8/1974 | Uramoto . |
| 3,877,352 | 4/1975 | Brieske . |
| 3,889,871 | 6/1975 | White . |
| 3,945,528 | 3/1976 | Mowrey, Jr. . |
| 3,966,524 | 6/1976 | Lehmacher . |
| 3,982,687 | 9/1976 | Auer et al. . |
| 4,041,851 | 8/1977 | Jentsch . |
| 4,072,233 | 2/1978 | Kramer . |
| 4,078,659 | 3/1978 | Rensner . |
| 4,148,431 | 4/1979 | Lepisto . |
| 4,165,832 | 8/1979 | Kuklies et al. . |
| 4,172,238 | 11/1979 | Fowles et al. . |
| 4,191,230 | 3/1980 | Ausnit . |
| 4,235,653 | 4/1980 | Ausnit . |
| 4,252,269 | 2/1981 | Peppiatt . |
| 4,285,376 | 8/1981 | Ausnit . |
| 4,334,028 | 6/1982 | Carver . |
| 4,682,366 | 7/1987 | Ausnit et al. . |

FOREIGN PATENT DOCUMENTS

| Number | Date | Country |
|---|---|---|
| 507869 | 11/1954 | Canada . |
| 907574 | 8/1972 | Canada . |
| 1922955 | 6/1965 | Fed. Rep. of Germany . |
| 2155091 | 5/1972 | Fed. Rep. of Germany . |
| 2157072 | 6/1973 | Fed. Rep. of Germany . |
| 2811219 | 8/1979 | Fed. Rep. of Germany . |
| 2811143 | 9/1979 | Fed. Rep. of Germany . |
| 1282028 | 12/1961 | France . |
| 1363090 | 4/1964 | France . |
| 1262658 | 6/1967 | France . |
| 1551228 | 12/1968 | France . |
| 205390 | 4/1971 | France . |
| 35-29874 | 11/1960 | Japan . |
| 53-63178 | 6/1978 | Japan . |
| 53-27631 | 7/1978 | Japan . |
| 632707 | 12/1949 | United Kingdom . |
| 878107 | 9/1961 | United Kingdom . |
| 1022595 | 3/1966 | United Kingdom . |
| 2131392 | 6/1989 | United Kingdom . |

OTHER PUBLICATIONS

Packaging Digest, Apr. 1981.
Paper, Film & Foil Converter, Apr. 1981.
Proceedings of 1st Canadian Symposium (V. M. Bhatnager 1978), pp. 76–87.

Primary Examiner—Bryon P. Gehman
Attorney, Agent, or Firm—Fitzpatrick, Cella, Harper & Scinto

[57] ABSTRACT

A reusable plastic bag with a loop handle is disclosed for packaging goods in a sealed manner with perforations being provided to facilitate access to the goods without interfering with the reusability of the bag. The bag is made from a laminate of opaque plastic material on which printing is applied and over which is bonded a transparent layer to protect the printing and increase the strength of the bag.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

* * * * *